United States Patent
Nguyen et al.

(10) Patent No.: US 7,177,318 B2
(45) Date of Patent: Feb. 13, 2007

(54) METHOD AND APPARATUS FOR MANAGING MULTICAST DATA ON AN IP SUBNET

(75) Inventors: Lan V. Nguyen, Austin, TX (US); Charles E. Cannon, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 954 days.

(21) Appl. No.: 09/929,211

(22) Filed: Aug. 14, 2001

(65) Prior Publication Data

US 2003/0035378 A1 Feb. 20, 2003

(51) Int. Cl.
*H04J 3/26* (2006.01)
(52) U.S. Cl. ...................... 370/432; 370/390
(58) Field of Classification Search ............... 370/390, 370/432
See application file for complete search history.

(56) References Cited

U.S. PATENT DOCUMENTS

| | | | |
|---|---|---|---|
| 5,634,011 A * | 5/1997 | Auerbach et al. ........... 709/242 |
| 6,058,113 A * | 5/2000 | Chang ......................... 370/390 |
| 6,298,058 B1 * | 10/2001 | Maher et al. ................ 370/390 |
| 6,718,387 B1 * | 4/2004 | Gupta et al. ................. 709/226 |
| 6,826,612 B1 * | 11/2004 | Bosloy et al. .............. 709/227 |
| 6,847,620 B1 * | 1/2005 | Meier ......................... 370/328 |
| 6,944,786 B2 * | 9/2005 | Kashyap ........................ 714/4 |
| 2003/0035378 A1 * | 2/2003 | Nguyen et al. ............. 370/250 |

FOREIGN PATENT DOCUMENTS

EP 1119134 A2 7/2001
WO WO 98/48343 10/1998

* cited by examiner

*Primary Examiner*—Doris H. To
*Assistant Examiner*—Steve Blount
(74) *Attorney, Agent, or Firm*—James L. Clingan, Jr.; Joanna G. Chiu

(57) ABSTRACT

A communication system, in one embodiment, has set top boxes that the have the ability to monitor the subnet to which they are coupled. A multicast router couples one or more groups, such as groups of video programs, to the set top boxes as requested by the set top boxes. If one set top box leaves a first group, for example, and thus sends a leave message to the router, the other set top box or boxes know to send a join message if they are subscribed to that first group. Thus, the router knows immediately to couple that first group on that subnet.

3 Claims, 2 Drawing Sheets

METHOD AND APPARATUS FOR MANAGING MULTICAST DATA ON AN IP SUBNET

BACKGROUND OF THE INVENTION

1. Field of the Invention

This invention relates generally to communications systems and more particularly to managing a data stream on an IP subnet.

2. Discussion of Related Art

A common technique used for receiving data and other manipulation of data is the internet protocol (IP) and subject to the Internet Group Management Protocol (IGMP) standard. In the use of IP to send data, one of the techniques that has developed for the situation in which a number of entities want to receive the data is a technique called multicasting. This technique is an improvement over a unicasting in which each recipient of data receives its data separately or broadcasting where all communication links are tied up with the data. This technique is used so that the entities that want to receive the data receive the data and this is efficiently achieved by using a router that is closest to the subscribers on a subnet in sending the data to the multiple users. Thus, only the bandwidth needed is used.

Set-top boxes may be coupled to the subnet. Such set-top boxes may be useful for driving a television monitor for example and may be useful for translating data for transmission. Thus there are multiple set top boxes connected to a single router on a particular subnet. These various STBs may be subscribing to different streams of data but will receive all of the data on their subnet. A typical stream of data may be a movie or a live sporting event, and, thus may stream data that is continuous and time relevant. That is, the data continues to flow relentlessly.

In such a case a particular set top box may switch to a different channel or group that is desired to be received. This can be described also as subscribing to a different group. The channel being subscribed to, in the terminology of IGMP, is the join group. When a group is joined by an STB it initiates a message indicating that it desires to join that particular group. The router responds by providing that group along the subnet. If the router is not already receiving that particular group, then it sends a message to the router that is driving it to indicate that it needs to receive that group. If that router is not receiving the data, then it needs to similarly send a message backwards to ultimately a source of the particular data. This is achieved by a join message according to the IGMP standard. At the time that a particular STB wants to change groups, it is considered to be leaving one group and joining another.

Thus, at the time that it makes the change it generates a leave message and a join message. The leave message indicates which group is being left. The join message indicates which group is to be joined. This is handled by the router in one of two ways. More recently the most common way has become what is called fast leave. In such cases, the termination of the transmission of the group, which is subject to the leave message, is immediate and the new group joined is also immediate. Thus, the particular STB that is changing causes the multicast router to immediately stop transmitting the first group in response to the leave message and start transmitting the new group. The problem with this is that there may be other set top boxes on the subnet that want to receive that first group. Thus, the change by one set top box to a new group will cause the termination of the transmission of that first group to the subnet and thus the set top box that still desires to receive that first group is no longer receiving the first group. Thus, the set top box that is removing the first group will cause at least some time of interruption of the incoming data for other set-top boxes on that subnet that are subscribed to the first group. The nature of streaming data, for example, is such that the particular data is completely interrupted and lost to the recipient. So, for example, if a live sporting event is being viewed, then that time that is missed is not recoverable by the user of the STB. This is a risk of the fast leave approach.

Prior to the fast leave approach, the more common approach was the standard leave approach which involved sending out a message to the subnet asking if any of the set top boxes there wanted to retain that group that was being terminated. That worked so long as the changing of the set top box only changed to one new group. The problem is that the changing set top box could make multiple changes by the time the router had completely received and reconciled the first requests to know if there were other set top boxes wanting to receive that first group. The result is that the subnet could become overcrowded with data because each new group that was joined would initially begin transmission. The router sends a Query message and waits up to ten seconds before terminating the stream. Because there was roughly a 10 second delay for the termination of each group that was indicated as being left there was an accumulated 10 seconds of changes, each of which would be transmitted simultaneously on the same subnet. If the subnet became overcrowded, none of the data was reliable and would be garbage. In the case of video it may not look like anything or sound like anything that was intelligible. Thus, in effect there was a constraint on the user to only change once every 10 seconds that may be an undesirable or unenforceable type of restriction and this would adversely effect the other set top boxes on the subnet.

One solution to this has been to change the router so that it will only transmit data that does not exceed the bandwidth that is available on the subnet. This may be difficult to achieve because each channel may not be easily determined as to what bandwidth is being occupied by that channel or group. Also, the difficulty in knowing which channel to keep transmitting and which channel to terminate is not based on the actual desired combination of groups. In the case where there are multiple changes or where different subscribers or set top boxes are changing over the same time period it would be impossible to know which of the channels that are actually are desired and the wrong ones could be terminated to control the bandwidth. Thus, although the data that is being provided may be valid it may not be the data that is desired. Also, the desired data may get interrupted. Further, the solution does not solve the problem to the user of the set top box if the router that is being utilized does not have this feature. That solution depends upon the entity that controls the router.

Thus, there is a need in set top boxes for the ability to avoid improper termination while also providing rapid provision of new desired groups on a subnet.

DETAILED DESCRIPTION

A communication system, in one embodiment, has set top boxes that have the ability to monitor the subnet to which they are coupled. A multicast router couples one or more groups, such as groups of video programs, to the set top boxes as requested by the set top boxes. If one set top box leaves a first group, for example, and thus sends a leave message to the router, the other set top box or boxes know to send a join message if they are subscribed to that first group. Thus, the router knows immediately to couple that first group on that subnet. This is described in more detail with respect to the figures.

Figure 1:
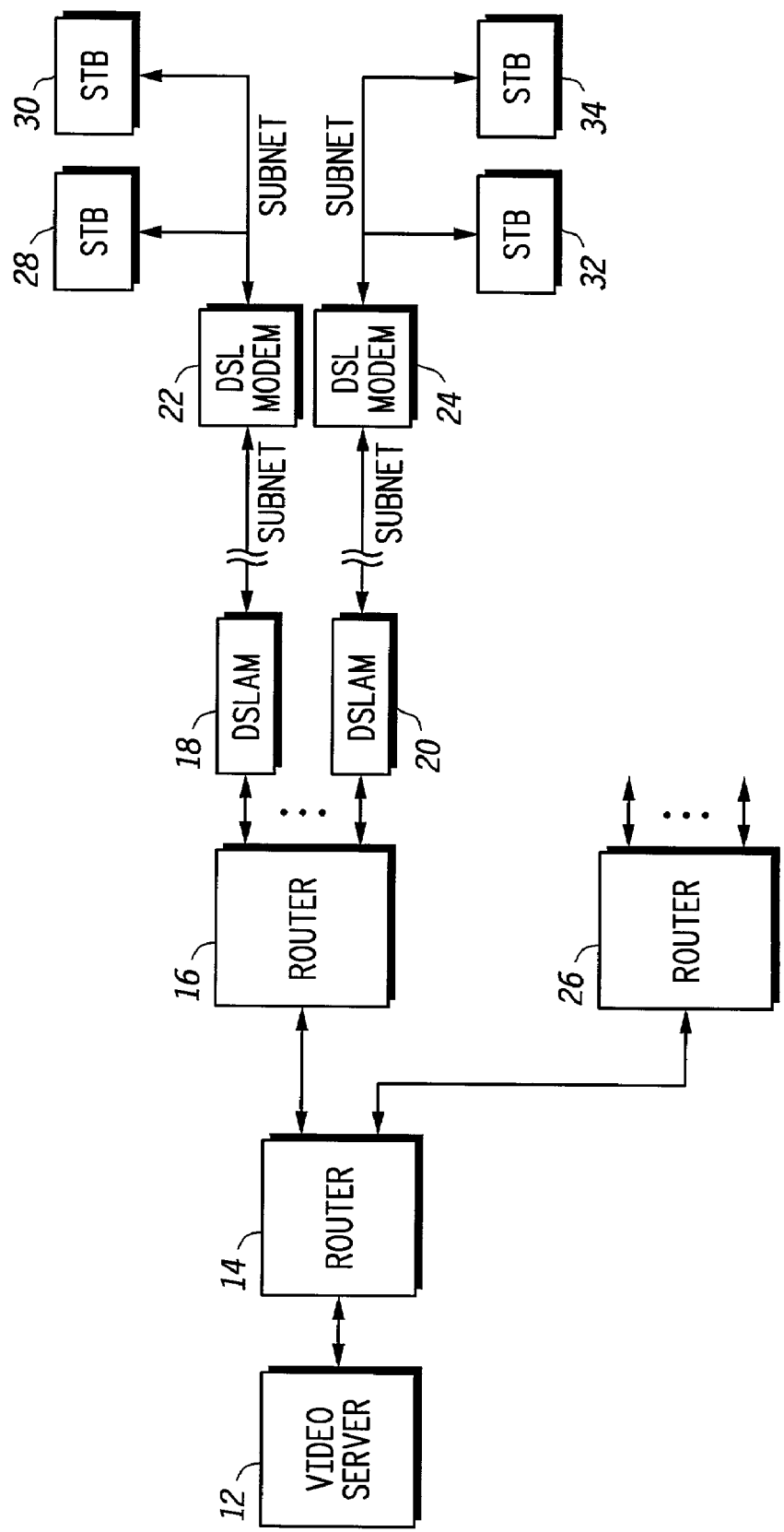
FIG. 1 is a communications system according to an embodiment of the invention.

Shown in FIG. 1 is a communication system 10 comprising a video server 12, a router 14, a router 16, a DSLAM 18, a DSLAM 20, a DSL modem 22, a DSL modem 24, a router 26, a set top box (STB) 28, an STB 30, an STB 32 and an STB 34. Video server 12 is a source of streaming data that is provided as IP data and according to the IGMP standard. The data is actually packet data but the information should be ultimately viewed and/or heard continuously. Router 14 supplies the streaming data to routers 16 and 26 as requested by routers 16 and 26. In this example router 16 provides the streaming data to DSLAM 18 and DSLAM 20 as requested. Data is sent along a subnet to DSL modem 22 and DSL modem 24 as requested via one or more of STBs 28–34. STB 28 and STB 30 are coupled to the same subnet and to DSL modem 22. DSL modem 22 is connected to the same subnet on both sides, both as an input and an output.

DSL modem is for interpreting the data that is transmitted both from DSLAM 18 and from STBs 28 and 30 the data travels in both directions. DSL is a commercially available technique for providing very high-speed data transmission over a line that would generally not have been considered to be able to transmit at those speeds, typically a telephone line. Router 16 is a multicast router that responds to subscriber requests from STB 28 and STB 30. As shown in FIG. 1, the subnets are asymmetrical digital subscriber line (ADSL), but they may be Ethernet, Asynchronous Transfer Mode (ATM), very high bit rate digital subscriber line, and even wireless.

STBs 32 and 34 are coupled to DSL modem 24 and are part of the subnet on both sides of DSL modem 24. The subnet for STBs 28 and 30 is separate from the subnet for STBs 32 and 34. This subnet distinction is provided at router 16. DSLAMs 18 and 20 are typically included as one physical unit but are separate in providing an output and receiving an input from DSL modem to which they are connected. Similarly, each DSLAM subunit such as DSLAM 18 has a particular and distinct data stream received from router 16. DSLAM 20 receives through known demodulation techniques its particular data that is for the subnet that it is connected to. STB 28 and STB 30 as well as STBs 32 and 34 have a capability that avoids problems of having too much data on the subnet as well as the problem of having the video interrupted due to one of STB 28 or STB 30 changing. The subnet is designed to handle at least one channel per STB. Thus, the bandwidth of the subnet connected to STBs 28 and 30 has the bandwidth for handling two channels. The channels vary somewhat in their individual bandwidth requirements so the subnets bandwidth must take into account the largest amount of bandwidth that two channels could possibly take. Thus, whatever two channels are on the subnet there is sufficient bandwidth for those two channels.

Figure 2:
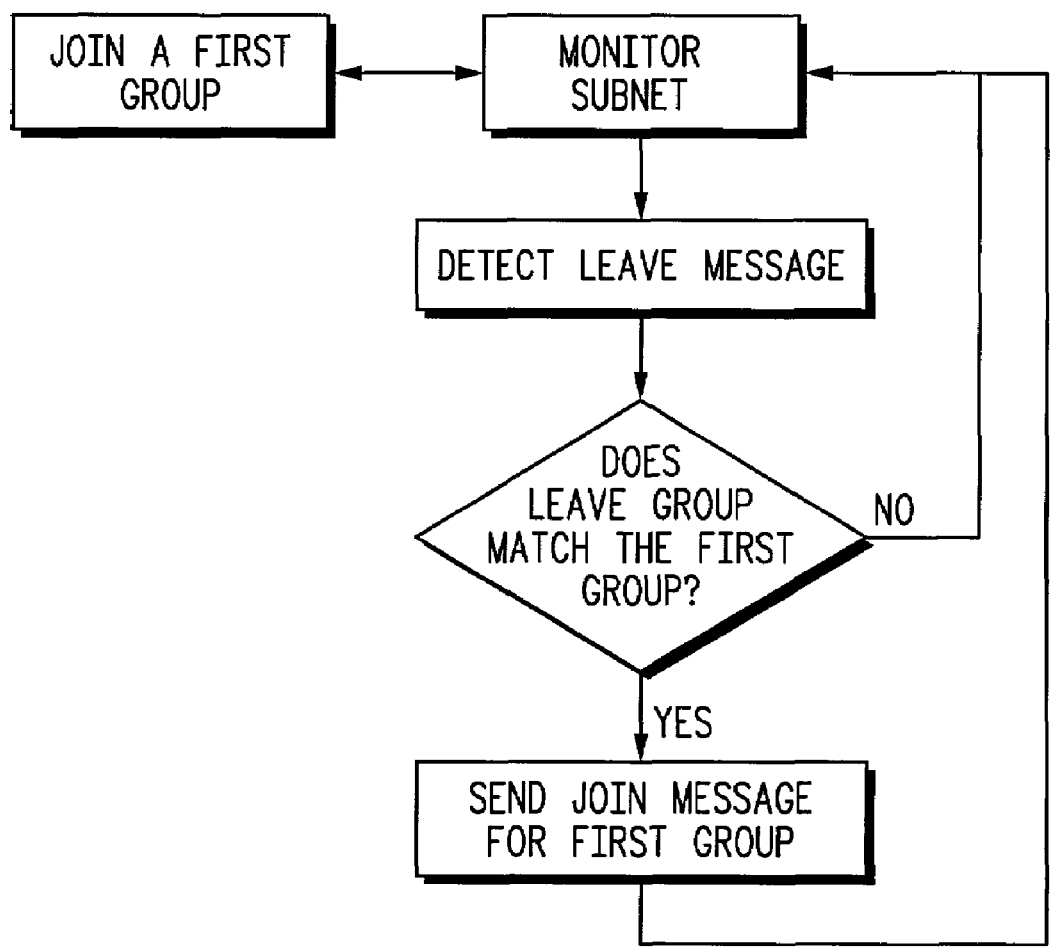
FIG. 2 is a flow diagram for operating a portion of the communications system of FIG. 1 according to the embodiment of the invention.

Shown in FIG. 2 is a flow diagram that describes the operation of STBs 28–34. Assume in this case that STB 30 has requested a first group from a plurality of available multicast groups. In referring to FIG. 2, this would be the process for STB 28 that is on the same subnet as STB 30 which has joined a first group. Beginning the process shown in FIG. 2, STB 28 joins the first group as well. STB 28 monitors the subnet. STB 30 then changes groups. Thus, it is leaving the first group and generates a leave message on its subnet that informs router 16 of the desire to leave the first group. Since STB 28 is monitoring the subnet, it detects the leave message generated by STB 30. STB 28 then determines if the leave group, the group which is the group that STB 30 has left, matches the first group. In this case STB 30 did leave the first group so the answer to that question is yes. If the answer is yes to that question, STB 28 sends a join message for the first group. In such a case router 16 will transmit the first group. There will be a very slight interruption in data flow but that interruption will be measured in milliseconds not visible for video applications. Thus, STB 30 upon leaving the first group causes router 16 to stop transmitting the first group but STB 28 immediately generates a join message for joining the first group so that router 16 would very quickly begin transmitting the first group again to the subnet that STBs 28 and 30 are coupled to. The time is so short between the termination of sending the first group and sending it again that it is not detectible as video or audio to a user.

Thus, router 16 can continue to be a router that is simply capable of the fast leave operation. The fast leave operation is the most common operation for routers at this time. Thus, there is no requirement for a change in existing router technology. Thus, a user can utilize an existing system and achieve the desirable feature of not having the video stream interrupted by using the improved features of set top boxes 28–34. This feature is applicable to not just set top boxes but any client device or IGMP host using IGMP data transmission techniques. Other examples of such client devices are a personal computer, an internet appliance, and a personal digital assistant. The need to use DSL modems will also depend on the particular use. The DSL modems are of particular value in a home environment with the STBs used with multiple television sets. Another subnet, however, may be on a ship or an airplane in which case the DSL modems would not likely be necessary. Also, the router may be at an apartment complex in which case the DSL modems would not likely be necessary either. Further, STBs 28–34 may be achievable by just software changes to existing STBs. The software may be stored in any computer readable medium. Examples include semiconductor memory, magnetic media, and optical media.

The invention claimed is:

1. A method for managing multicast data on an Internet Protocol (IP) subnet having a first and a second client device coupled thereto, the first and second client device belonging to a multicast group, the method comprising:

the first client device sending a leave message on the IP subnet indicate leaving the multicast group;

the second client device detecting the leave message; and in response to detecting the leave message, the second client device sending a join message to indicate rejoining the multicast group.

2. A first client device coupled to an IP subnet, the IP subnet capable of being coupled to a second client device, the first client device and second client device belonging to a multicast group, the first client device comprising:

means for detecting a leave message sent by the second client to indicate leaving the multicast group; and
means for sending a join message to indicate rejoining the multicast group in response to detecting the leave message.

3. The first client device of claim 2, wherein the IP subnet is capable of being coupled to a router, wherein the router is configured to operate in fast-leave mode.

* * * * *